(12) United States Patent
Shah

(10) Patent No.: US 7,550,953 B2
(45) Date of Patent: Jun. 23, 2009

(54) COARSE VOLTAGE REGULATION OF A PERMANENT MAGNET GENERATOR (PMG)

(75) Inventor: Mahesh J. Shah, Lindenhurst, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 265 days.

(21) Appl. No.: 11/478,282

(22) Filed: Jun. 29, 2006

(65) Prior Publication Data

US 2008/0001580 A1 Jan. 3, 2008

(51) Int. Cl.
H02P 9/14 (2006.01)
H02K 1/00 (2006.01)
H02K 3/00 (2006.01)

(52) U.S. Cl. .................................. 322/46; 310/179
(58) Field of Classification Search .............. 310/179, 310/180, 184, 189, 206; 322/46
See application file for complete search history.

(56) References Cited

U.S. PATENT DOCUMENTS

| | | | | | |
|---|---|---|---|---|---|
| 5,227,710 | A | * | 7/1993 | Lewus | 318/781 |
| 5,625,276 | A | * | 4/1997 | Scott et al. | 322/24 |
| 5,912,522 | A | * | 6/1999 | Rivera | 310/184 |
| 5,977,648 | A | | 11/1999 | Seffernick et al. | |
| 6,093,987 | A | * | 7/2000 | Bukoschek et al. | 310/68 A |
| 6,124,702 | A | * | 9/2000 | Pinkerton et al. | 322/90 |
| 6,169,383 | B1 | * | 1/2001 | Johnson | 318/771 |
| 6,359,800 | B1 | * | 3/2002 | Liang et al. | 363/70 |
| 6,493,924 | B2 | * | 12/2002 | Das | 29/596 |
| 7,049,719 | B2 | * | 5/2006 | Wobben | 310/80 |
| 7,327,123 | B2 | * | 2/2008 | Faberman et al. | 322/37 |
| 2003/0030344 | A1 | * | 2/2003 | Hatz et al. | 310/179 |
| 2004/0061400 | A1 | | 4/2004 | Fukushima et al. | |
| 2004/0189242 | A1 | * | 9/2004 | Pyntikov et al. | 318/721 |
| 2005/0104562 | A1 | | 5/2005 | Hatz et al. | |

FOREIGN PATENT DOCUMENTS

WO WO 98/08291 2/1998

OTHER PUBLICATIONS

ForceField, "Regulator for Permanent Magnet Alternators", 2000.

* cited by examiner

*Primary Examiner*—Julio Gonzalez
(74) *Attorney, Agent, or Firm*—Kinney & Lange, P.A.

(57) ABSTRACT

A permanent magnet generator voltage regulation system controls the output voltage of a permanent magnet generator. The output voltage of the permanent magnet generator is controlled by configuring the electrical connection of the stator coils. A monitoring device monitors the output voltage generated by the PMG, and a controller selectively configures the stator coil configuration based on the monitored output voltage. A switch array having a number of switches is connected to the stator coils, the switches being controlled by the controller to configure the electrical connection of the stator coils. For instance, to maximize output voltage generated by the PMG, the controller causes the switch array to connect the stator coils in series with one another. To reduce the output voltage, the controller causes the switch array to connect at least some of the stator coils in parallel with one another. In this way, the output voltage of the permanent magnet generator can be coarsely controlled.

11 Claims, 5 Drawing Sheets

COARSE VOLTAGE REGULATION OF A PERMANENT MAGNET GENERATOR (PMG)

BACKGROUND OF THE INVENTION

The present invention relates to permanent magnet generators (PMG). In particular, the present invention relates to a system and method of regulating the output of a permanent magnet generator.

Generators are electromechanical devices that convert mechanical energy to alternating current (AC) electrical energy. Generators may receive mechanical energy from any number of sources. For instance, a generator may be provided with mechanical energy by a combustion engine such as a diesel engine. A magnetic field generated in the rotor of the generator is caused to rotate by the mechanical energy provided to the generator. The rotating magnetic field interacts with conductors wound in coils around an iron core (commonly referred to as the stator windings, resulting in AC current being generated within the stator windings. The magnitude of the AC current generated within the stator windings is directly related to the speed of the rotor and the strength of the magnetic field generated by the rotor.

Generating the magnetic field in the rotor can be done in a number of ways. For example, in wound field synchronous generators the rotor may include coils (commonly referred to as field windings) that are energized by providing current to the field windings. The AC power generated by the wound field synchronous generator is controlled by selectively varying the magnitude of the current provided to the field windings, and therefore controlling the strength of the magnetic field generated by the rotor. In the alternative, field windings wrapped around the rotor may be replaced by permanent magnets in what is known as a permanent magnet generator (PMG) or permanent magnet alternator (PMA). These types of machines are generally more efficient and robust than the wound field synchronous machines. Unlike wound field generators, the magnitude of the magnetic field generated by the permanent magnets of a permanent magnet machine is constant. Therefore, one common way of controlling the output voltage generated by a permanent magnet machine is to control the speed of the prime mover providing mechanical power to the PMG. This drawback makes PMGs impractical in a number of applications, or requires PMGs to include additional hardware such as shunt voltage regulators in order to reduce AC power generated at increased rotor speeds.

BRIEF SUMMARY OF THE INVENTION

In one aspect, the present invention is a system for regulating an output voltage generated by a permanent magnet generator (PMG). The system includes a PMG having a permanent magnet rotor and a stator having a plurality of stator coils. The system further includes a monitoring device, a controller, and a switch array. Based on the output voltage monitored by the monitoring device, the controller selects the stator coil configuration required to generate the desired output voltage. The controller alters the stator coil configuration by selectively opening and closing switches in the switch array.

In another aspect, the present invention is a method for controlling the output voltage of a permanent magnet generator. The method includes monitoring the output voltage generated by the PMG, and selectively altering the configuration of stator coils based on the monitored output voltage to generate a desired output voltage.

DETAILED DESCRIPTION

Figure 1:
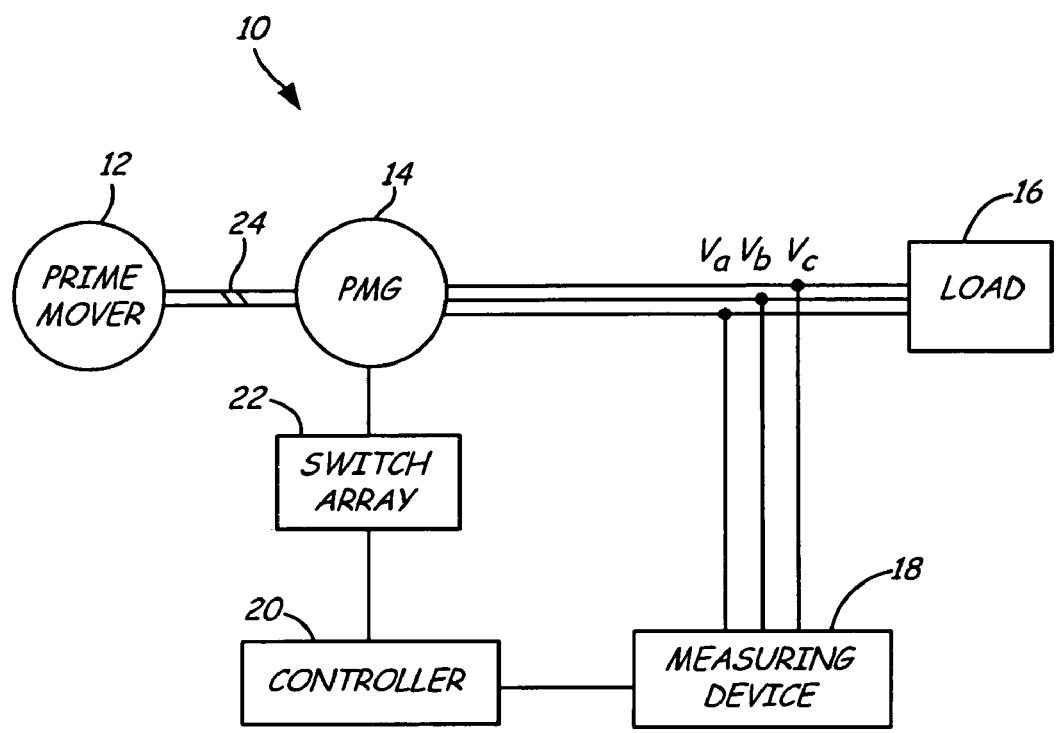
FIG. 1 is a functional block diagram of a permanent magnet generator system including coarse voltage control of the permanent magnet output voltage.

FIG. 1 shows an embodiment of permanent magnet generator coarse voltage regulation system 10, including prime mover 12, permanent magnet generator (PMG) 14, three-phase output voltage $v_a$, $v_b$, and $v_c$, load 16, monitoring device 18, controller 20, and switch array 22 having a plurality of switches. Prime mover 12 is connected to PMG 14 by a drive shaft 24, which supplies PMG 14 with rotational, mechanical energy. PMG 14 converts the mechanical energy supplied by prime mover 12 to electrical energy, which is supplied to load 16 and is illustrated as three-phase alternating current (AC) output voltage $v_a$, $v_b$, and $v_c$ (collectively "output voltage $v_{out}$").

There are two variables external to PMG 14 that affect output voltage $v_{out}$. The first is the rotational velocity of prime mover 12. As prime mover 12 rotates faster, output voltage $v_{out}$ provided by PMG 14 increases. If prime mover 12 rotates slower, then output voltage $v_{out}$ provided by PMG 14 decreases. The second variable that affects output voltage $v_{out}$ is the impedance of load 16. If the impedance of load 16 increases, output voltage $v_{out}$ provided by PMG 14 will decrease. If the impedance of load 16 decreases, output voltage $v_{out}$ provided by PMG 14 will increase. In a number of applications, rotational velocity of the prime mover and impedance of the load are not easily controlled. The present invention provides a system and method of coarsely controlling output voltage $v_{out}$ despite variations in rotational velocity of prime mover 12 and impedance of load 16.

Figure 3A:
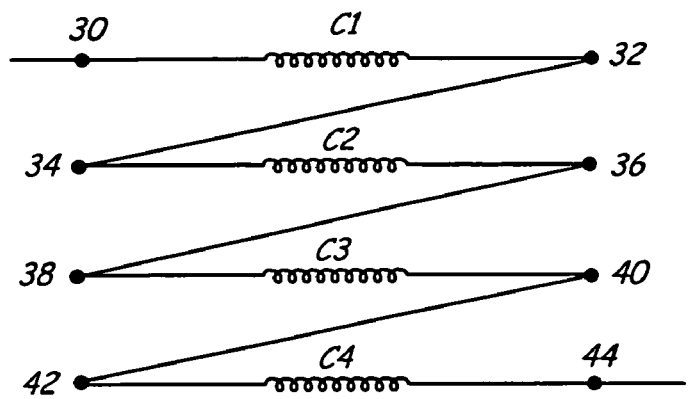
FIGS. 3A-3C are circuit diagrams showing three stator coil configurations.
Figure 3B:
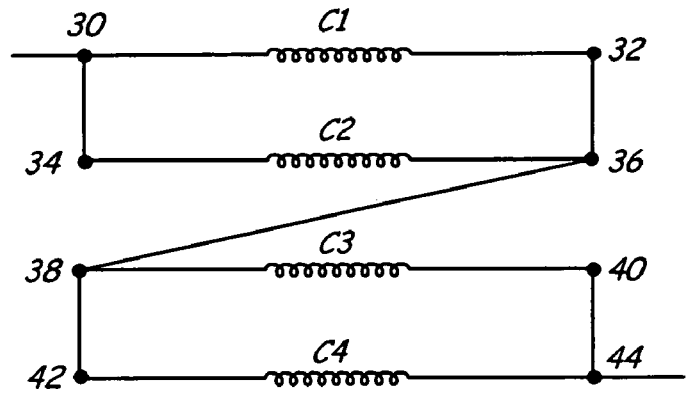

To control output voltage $v_{out}$, measuring device 18 monitors output voltage (also known as terminal voltage) at each of the three phases $v_a$, $v_b$, and $v_c$. Typically, the output voltages at each of the three phases will be approximately the same. However, conditions can arise that result in different output voltages being generated at each phase. Monitoring device 18 provides controller 20 with the measured output voltages $v_{out}$. Based on the measured output voltages $v_{out}$, controller 20 operates switches within switch array 22 to alter the configuration of stator coils (shown in FIGS. 3A-3C) within PMG 14. In one embodiment, switches within switch array 22 are power transistors capable of withstanding the current generated by PMG 14 for a respective load 16. For instance, when prime mover 12 is providing relatively low revolutions per minute (RPMs) to PMG 14, then the stator coils are arranged in the typical series-connection configuration that maximizes the output voltage $v_{out}$ (as shown in FIG. 3A). As the measured output voltage increases, controller 20 selectively alters the stator configuration such that at least some of the stator coils are connected in parallel with one another (as shown in FIG. 3B). This parallel configuration of stator coils reduces the output voltage $v_{out}$ generated by PMG 14. In this way, as the speed of prime mover 12 changes (or likewise, as load 16 changes) the output voltage $v_{out}$ can be maintained at a desired level by selectively altering the configuration of the stator coils. In the alternative, rather than simply maintaining the output voltage at a desired level, the output voltage can be controlled (selectively increased or decreased) based on requirements of load 16.

Figure 2:
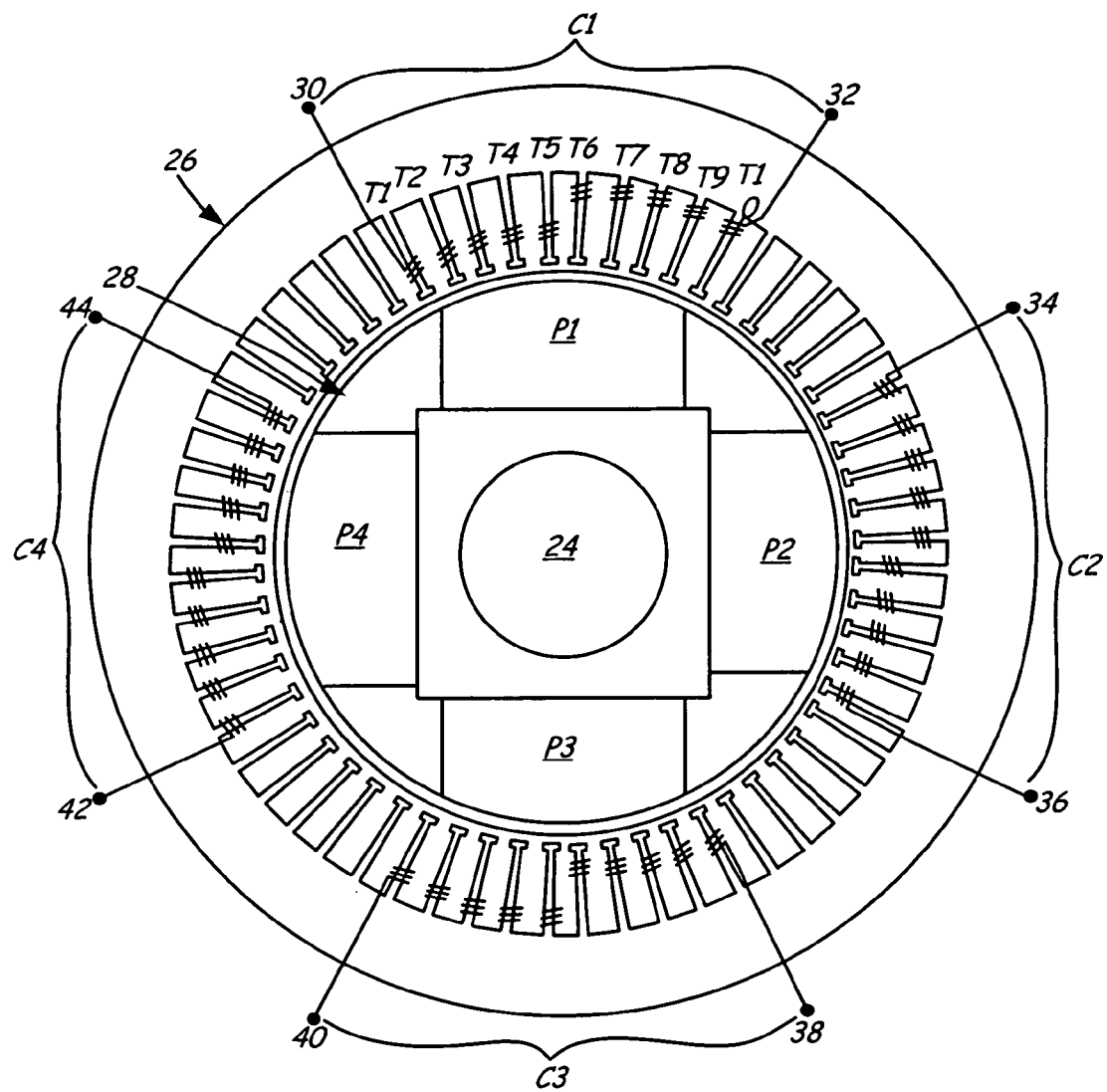
FIG. 2 is a cross sectional view illustrating the geometry of the permanent magnet generator shown in FIG. 1.

FIG. 2 shows an embodiment of permanent magnet generator 14 of the present invention, including stator 26, rotor 28, stator teeth T1-T60 (only stator teeth T1-T10 are labeled), permanent magnet poles P1-P4, and stator coils (only stator coils C1-C4 are shown). For the sake of simplicity, only the coils (C1-C4) responsible for generating output voltage $v_a$ are shown in FIG. 2. To generate more than a single-phase of power, additional coils would be wound around stator 26, in a configuration similar to the configuration of stator coils C1-C4. Furthermore, only four coils (C1-C4) are used in this embodiment to generate each single phase of power (in this case, output voltage $v_a$). In other embodiments, a greater or fewer number of stator coils may be used to generate each phase of power.

Drive shaft 24 (as shown in FIG. 1) is connected to rotor 28, causing rotor 28 to rotate relative to stator 26. In this embodiment, rotor 28 includes four magnetic poles, labeled P1, P2, P3, and P4, making this a four-pole rotor. For the sake of simplicity, a four-pole rotor is described, although in other embodiments the rotor could include a greater number of magnetic poles.

Stator 26 includes a plurality of stator teeth T1-T60 defined by stator slots, making this a sixty-slot stator. Each tooth is defined by two adjacent stator slots, with windings being wound around the stator teeth as required. As shown in more detail in FIG. 2B, coil C1 is wrapped around stator teeth T1-T10. Coils may be wrapped in a number of configurations depending on the application. In this embodiment, coil C1 is wrapped sequentially around stator teeth, T1, T6, T2, T7, T3, T8, T4, T9, T5 and T10. Coils C2-C4 are wrapped in a similar manner around the respective stator teeth.

Each stator coil C1-C4 includes two terminals that connect stator coils C1-C4 to switch array 22. For instance, stator coil C1 includes terminals 30 and 32, stator coil C2 includes terminals 34 and 36, stator coil C3 includes terminals 38 and 40, and stator coil C4 includes terminals 42 and 44. Connecting stator coils C1-C4 to switch array 22 allows stator coils C1-C4 to be connected in a plurality of different configurations.

Figure 3C:
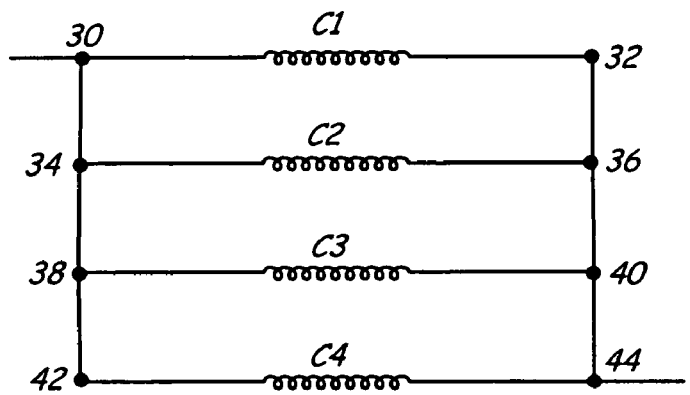
Figure 4:
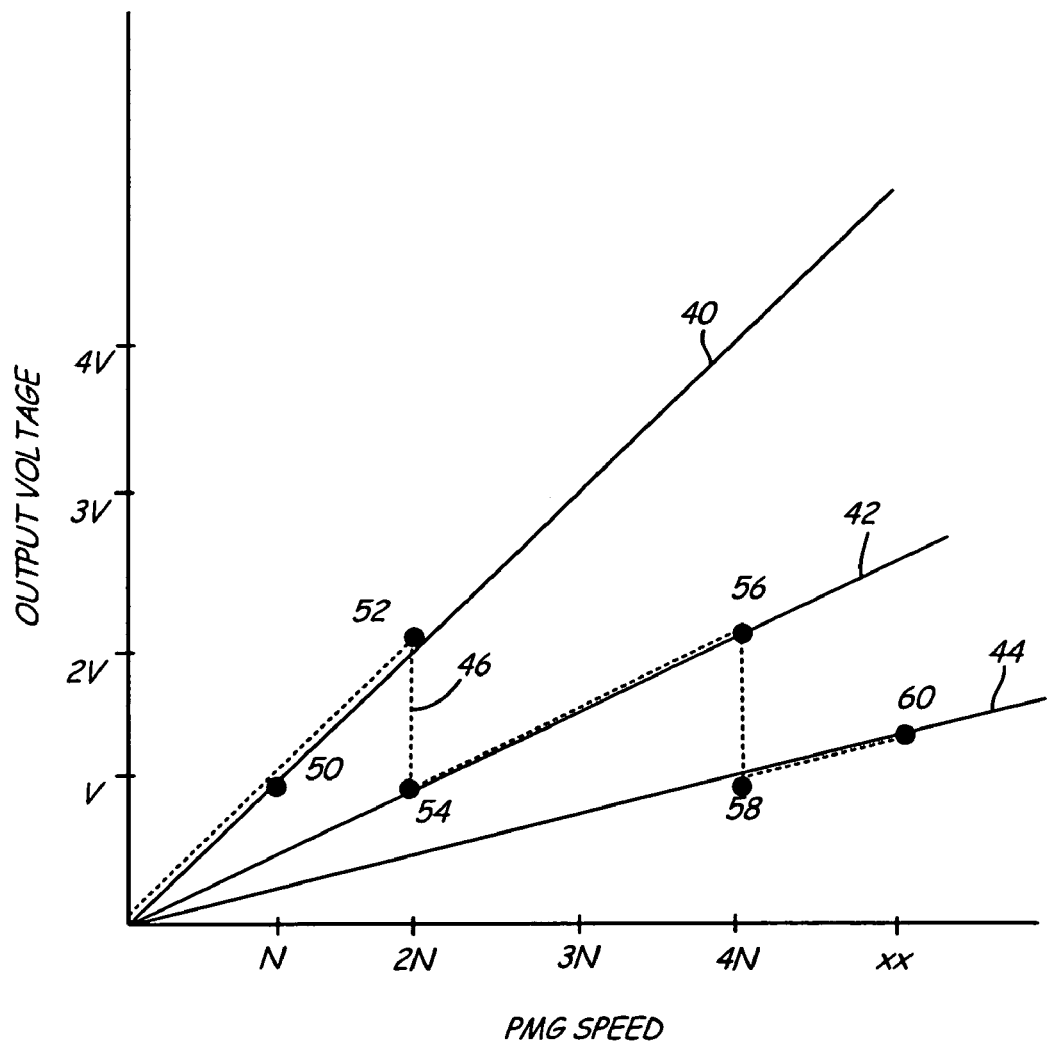
FIG. 4 is graph that relates output voltage generated by the permanent magnet generator to the speed of permanent magnet generator for each of the stator coil configurations shown in FIGS. 3A-3C.
Figure 5:
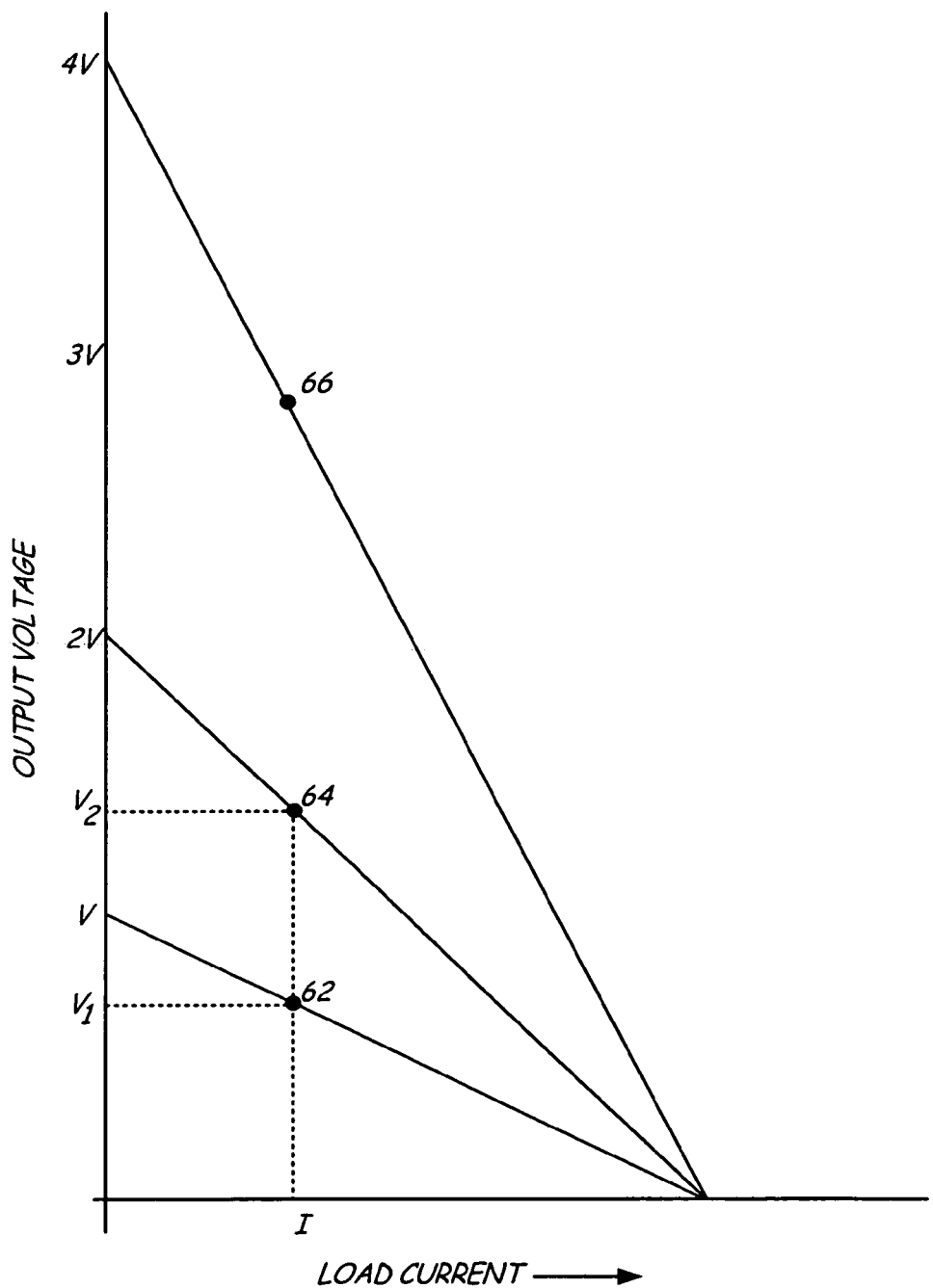
FIG. 5 is a graph showing output voltage generated by the permanent magnet generator as a function of load current for each configuration of stator coils.

FIGS. 3A-3C illustrate the possible stator coil configurations for coils C1-C4 of PMG 14. The effect of each stator coil configuration on the output voltage (under no load conditions) is shown in FIG. 4. Specifically, the graph in FIG. 4 shows the relationship between the no load output voltage and the speed of PMG 14 for each of the stator coil configurations shown in FIGS. 3A-3C. The graph in FIG. 5 shows the ability of the present invention to regulate the output or terminal voltage of PMG 14 under load conditions.

In FIG. 3A, stator coils C1-C4 are connected in series with one another (also referred to as a single parallel path configuration). That is, switch array 22 connects terminal 32 of stator coil C1 to terminal 34 of stator coil C2, terminal 36 of stator coil C2 is connected to terminal 38 of stator coil C3, and terminal 40 of stator coil C3 is connected to terminal 42 of stator coil C4. This configuration maximizes the output voltage $v_a$ as shown by line 40 in FIG. 4. As the speed of PMG 14 increases from N to 2N (speed doubles), the output voltage generated by stator coils in this configuration increases from V volts to 2V volts (voltage doubles). As the speed of PMG 14 increases to 3N, the output voltage would increase to 3V volts, and so on.

In FIG. 3B, stator coils C1 and C2 are connected in parallel with one another, and stator coils C3 and C4 are connected in parallel with one another (also referred to as a two parallel path configuration). The parallel-connected stator coils C1 and 2 are connected in series with the parallel-connected stator coils C3 and C4. Specifically, switch array 22 connects terminal 30 of stator coil C1 to terminal 34 of stator coil C2, terminal 32 of stator coil C1 to terminal 36 of stator coil C2, forming a parallel connection between stator coils C1 and C2. Stator coils C3 and C4 are likewise connected in parallel. Terminal 36 of stator coil C2 is connected to terminal 38 of stator coil C3, resulting in two parallel-connected stator coils being connected in series. This configuration reduces output voltage $v_a$ with respect to the output voltage generated by the configuration shown in FIG. 3A. The output voltage $v_a$ generated by this configuration is related to speed of PMG 14 by line 42 shown in FIG. 4. As illustrated by FIG. 4, the configuration shown in FIG. 3B (line 42) reduces the output voltage by one-half with respect to the output voltage generated by the series configuration of stator coils shown in FIG. 3A (line 40). That is, if the speed of PMG 14 is 2N, instead of an output voltage of 2V volts, the output voltage is reduced to V volts. Likewise, if the speed of the PMG 14 increases to 4N, the output voltage of PMG 14 increases to only 2V volts.

In FIG. 3C, stator coils C1-C4 are connected in parallel with one another (also referred to as a four parallel path configuration). This configuration results in an output voltage $v_a$ that is related to speed of prime mover 12 by line 44 as shown in FIG. 4. This configuration results in the output voltage being reduced by one-half with respect to the output voltage generated by the configuration shown in FIG. 3B. That is, if the speed of PMG 14 is 4N, instead of an output voltage of 2V Volts as would be generated by the configuration shown in FIG. 3B, the output voltage is reduced to V volts. Therefore, as shown by FIGS. 3A-3C and FIG. 4, by selectively altering the configuration of stator coils, the output voltage can be regulated to a desired voltage.

FIG. 4 also illustrates one method of regulating output voltage $v_a$. Dashed line 46 connecting points 50, 52, 54, 56, 58 and 60 illustrates control of output voltage $v_{out}$ by controller 20. Monitoring device 18 (shown in FIG. 1) monitors the output voltage of each phase of power generated by PMG 14. For purposes of this example, controller regulates output voltage $v_{out}$ to a value of approximately V volts, without output $v_{out}$ falling below V volts. Therefore, when the speed of PMG 14 is approximately N, controller 20 controls switch array 22 to connect stator coils C1-C4 in the series configuration shown in FIG. 3A, resulting in an output voltage of V volts as shown by point 50. As the speed of PMG 14 increases to 2N, the output voltage monitored by monitoring device 18 increases to 2V volts, as shown by the point labeled 52. At this point, based on the monitored output voltage, controller 22 changes the configuration of stator coils from the configuration shown in FIG. 3A to the two parallel path configuration shown in FIG. 3B, resulting in the output voltage being reduced from 2V volts to V volts, as shown by the point labeled 54.

As the speed of PMG 14 increases from 2N to 4N, the output voltage increases from V volts (at point 54) to 2V volts (at point 56). When monitoring device 18 measures the output voltage to be 2V volts, as shown by point 56, controller 22 changes the configuration of stator coils from the configuration shown in FIG. 3B to the configuration shown in FIG. 3C, resulting in the output voltage being reduced from 2V volts to V volts, as shown by the point labeled 58. As the speed of PMG increases to a maximum speed of 5N, the output voltage generated by PMG 14, with stator coils connected in the configuration shown in FIG. 3C, only increases to 1.25V volts as shown by the point labeled 60. This is contrast with the output of a typical PMG generator, which would have a voltage of approximately 5V volts at a speed of 5N. Therefore, FIG. 4 illustrates the ability of the present invention to coarsely regulate the output voltage generated by PMG 14 despite increasing speeds of PMG 14. Controller 22 is therefore capable of controlling output voltage $v_{out}$ to a desired value by selectively altering the configuration of stator coils. Although in the present embodiment only four stator coils are shown, in other embodiments a greater number of stator coils may be employed. An increase in stator coils results in an increase in stator coil configurations that allows for further refinement of the output voltage.

FIG. 5 is a graph showing the relationship between the output voltage of PMG 14 and the load current drawn by load 16, wherein the load current drawn is equal to I amperes (A). Each line shown in FIG. 5 is based on the linear relationship between the voltage at no-load values (i.e., open circuit wherein current is equal to zero, shown by the intersection of each line with the y-axis), and the voltage at short circuit conditions (voltage equal to zero, shown by the intersection of each line with the x-axis). The graph in FIG. 5 illustrates the ability of the PMG voltage regulation system to regulate the output voltage under load conditions. When stator coils C1-C4 are in the one parallel path configuration shown in FIG. 3A, the load current I results in the output voltage of PMG 14 varying from a voltage of $V_1$ (shown by point 62) to a voltage of $V_2$ (shown by point 64) as the speed of PMG 14 increases from N RPM's to 2N RPM's. By altering the configuration of stator coils C1-C4 from the one parallel path configuration to the two-parallel path configuration, the output voltage is reduced from $V_2$ to $V_1$. Likewise, as the speed of PMG 14 increases from a speed of 2N to a speed of 4N, the output voltage generated by PMG 14 (with stator coils connected in the two-parallel path configuration) increases from a voltage of $V_1$ to a voltage of $V_2$. By altering the configuration of stator coils from the two-parallel path configuration to a four-parallel path configuration, the output voltage is reduced from $V_2$ to $V_1$.

The present invention therefore describes a permanent magnet generator system having coarse voltage regulation capabilities. Although the present invention has been described with reference to exemplary embodiments, workers skilled in the art will recognize that changes may be made in form and detail without departing from the spirit and scope of the invention. For instance, the present invention has been described with respect to a PMG that employs four stator coils capable of being connected in different configurations to regulate output voltage generated in a single phase of power. In other embodiments, fewer or greater numbers of stator coils may be employed. By increasing the number of stator coils, the number of possible stator coil configurations increases, allowing more finely tuned control and regulation of the output voltage.

The invention claimed is:

1. A permanent magnet generator voltage regulation system for a permanent magnet generator (PMG) having stator coils, the voltage regulation system comprising:
   means for monitoring an output voltage generated by the PMG;
   a switch array having switches connected to the stator coils; and
   a controller that selectively opens and closes the switches in the switch array based on the monitored output voltage to connect the stator coils in either a first stator coil configuration, a second stator coil configuration, or a third configuration, wherein the output voltage generated with the stator coils in the first configuration is greater than the output voltage generated with the stator coils in the second configuration, and the output voltage generated with the stator coils in the second configuration is greater than the output voltage generated with the stator coils in the third configuration.

2. The PMG voltage regulation system of claim 1, wherein the stator coils connected in the first configuration include a first stator coil, a second stator coil, a third stator coil and a fourth stator coil connected in series with one another.

3. The PMG voltage regulation system of claim 1, wherein the stator coils connected in the second configuration include a first stator coil connected in parallel with a second stator coil, a third stator coil connected in parallel with a fourth stator coil, and the parallel connection of the first stator coil and second stator coil connected in series with the parallel connection of the third stator coil and the fourth stator coil.

4. The PMG voltage regulation system of claim 1, wherein the stator coils connected in the third configuration include a first stator coil, a second stator coil, a third stator coil and a fourth stator coil connected in parallel with one another.

5. The PMG voltage regulation system of claim 1, wherein the PMG comprises:
   a rotor having permanent magnets;
   a stator having stator teeth; and
   stator coils wound around the stator teeth, wherein each stator coil has two terminals for connection to the switch array.

6. The PMG voltage regulation system of claim 1, wherein the switches are power transistors.

7. A method of regulating output voltage generated by a permanent magnet generator, the method comprising:
   monitoring the output voltage generated by the permanent magnet generator; and
   selectively opening/closing switches to connect stator coils in a first configuration, a second configuration, or a third configuration based on the monitored output voltage, wherein the output voltage generated with the stator coils in the first configuration is greater than the output voltage generated with the stator coils in the second configuration, and the output voltage generated with the stator coils in the second configuration is greater than the output voltage generated with the stator coils in the third configuration.

8. The method of claim 7, wherein connecting the stator coils in the first configuration includes connecting a first stator coil, a second stator coil, a third stator coil and a fourth stator coil in series with one another.

9. The method of claim 7, wherein connecting the stator coils in the second configuration includes connecting a first stator coil in parallel with a second stator coil, connecting a third stator coil in parallel with a fourth stator coil, and connecting the parallel connection of the first stator coil and second stator coil in series with the parallel connection of the third stator coil and the fourth stator coil.

10. The method of claim 7, wherein connecting the stator coils in the first configuration or the second configuration includes:
   selectively providing input signals to switches connected between terminals of the stator coils to electrically connect the stator coils in either the first configuration, the second configuration, or the third configuration.

11. The method of claim 7, wherein connecting the stator coils in the third configuration includes connecting a first stator coil, a second stator coil, a third stator coil and a fourth stator coil in parallel with one another.

* * * * *